United States Patent
Drivon et al.

(10) Patent No.: US 11,339,903 B2
(45) Date of Patent: May 24, 2022

(54) CLAMPING SYSTEM WITH FOLDABLE TABS FOR CONNECTING TUBES TOGETHER

(71) Applicant: CAILLAU, Issy les Moulineaux (FR)

(72) Inventors: Stéphane Drivon, Romorantin (FR); Nicolas Rigollet, Romorantin (FR)

(73) Assignee: Caillau, Issy les Moulineaux (FR)

( * ) Notice: Subject to any disclaimer, the term of this patent is extended or adjusted under 35 U.S.C. 154(b) by 416 days.

(21) Appl. No.: 16/391,845

(22) Filed: Apr. 23, 2019

(65) Prior Publication Data
US 2019/0331270 A1  Oct. 31, 2019

(30) Foreign Application Priority Data
Apr. 26, 2018  (FR) ...................................... 1853686

(51) Int. Cl.
*F16L 23/08* (2006.01)
*F16L 23/00* (2006.01)

(52) U.S. Cl.
CPC ............. *F16L 23/08* (2013.01); *F16L 23/003* (2013.01)

(58) Field of Classification Search
CPC ......... F16L 23/08; F16L 23/003; F16L 23/12; F16L 23/04; F16L 23/16; F16L 23/18; F16L 23/20
USPC ................................ 285/407, 408, 410, 420
See application file for complete search history.

(56) References Cited

U.S. PATENT DOCUMENTS 5,782,499 A * 7/1998 Gfrerer ................... F16L 23/08
                                                                  285/23

FOREIGN PATENT DOCUMENTS

| EP | 1 451 498 A1 | 9/2004 |
| EP | 2 598 785 A1 | 6/2013 |
| FR | 2 906 864 A1 | 4/2008 |

OTHER PUBLICATIONS

French Search Report (2 pages) dated Dec. 19, 2018 for FR Application No. 1853686.

* cited by examiner

*Primary Examiner* — Aaron M Dunwoody
(74) *Attorney, Agent, or Firm* — Fay Sharpe LLP

(57) ABSTRACT

The clamping system comprises a collar that comprises a belt suitable for being clamped around clamping surfaces projecting from tubes. The collar carries a series of angularly distributed foldable fingers, each finger presenting a free operating end projecting axially beyond the first edge of the belt over a distance that is sufficient to enable it to be manipulated by hand. Starting from an initial position in which the fingers define a rest minimum diameter, the fingers are suitable for being folded manually and plastically towards the axis of the belt in order to define a folded-in minimum diameter that is less than said rest minimum diameter.

13 Claims, 7 Drawing Sheets

CLAMPING SYSTEM WITH FOLDABLE TABS FOR CONNECTING TUBES TOGETHER

CLAIM OF PRIORITY

This application claims priority from French Patent Application No. 1853686, filed on Apr. 26, 2018, the entirety of which is hereby incorporated by reference.

BACKGROUND OF THE DISCLOSURE

The present disclosure relates to a clamping system for connecting together first and second tubes having facing ends that present clamping surfaces that project relative to the cylindrical outside surfaces of said tubes.

A clamping system of this type is known, e.g., from European patents EP 1 451 498 and EP 2 598 785.

In such a system, the collar comprises a belt suitable for being clamped around the clamping surfaces of the tubes. The belt presents flanks that define between them an internal setback in which the clamping surfaces of the tubes are placed in order to be clamped together. The tubes are thus held clamped relative to each other. As stated in the above-mentioned patents, it can be useful to pre-mount the clamping system on the end of at least one of the tubes before performing clamping.

In order to enable pre-mounting on both tubes, EP 2 598 785 recommends that the clamping system should include a washer that is held relative to the collar by fastener tabs, comprising first and second pre-mounting tabs suitable for co-operating respectively with the first tube and with the second tube in order to retain the washer, and, thus, the entire clamping system, relative to the respective clamping surfaces of the tubes before clamping them together. Specifically, those pre-mounting tabs comprise both short tabs extending back over the frustoconical annular shape of the washer in order to co-operate with the clamping surface of the tube having its clamping surface arranged between the belt and the washer, and also long tabs, which extend from the vertex of the washer in the opposite direction to the washer in order to co-operate with the clamping surface of the other tube.

In EP 2 598 785, the tabs of both of those categories are elastically deformable. That device generally gives satisfaction, but in certain applications it is important for the retention of the tabs relative to the clamping surfaces to be made reliable, in particular concerning the long tabs. Specifically, particularly for long tabs, it can be difficult to ensure a good range of elastic deformation for certain clamping diameters, in particular diameters that are large, being of the order of 5 centimeters (cm) or more. Firstly, it is appropriate to ensure that the modulus of elasticity of those tabs is high enough for them to present the desired amount of elasticity to enable them, after they have been deformed during engagement of the tube in the clamping system, to return elastically to a position providing pre-mounted retention of the tube. They then need to present the necessary springiness to avoid deforming too easily if traction is exerted on the tube in the direction for disengaging it from the clamping system. Nevertheless, that elastic retention is useful only in the pre-mounted state, before clamping. In the clamped state, it is desirable, on the contrary, for the tabs to be deformed so as to be pressed inside the belt of the collar without harming the quality of the clamping. Nevertheless, if the modulus of elasticity of the tab is high, then that property can be difficult to achieve in certain circumstances, in particular for collars of large diameters. Furthermore, if the modulus of elasticity is too high, the engagement thrust force needed for clipping the tabs onto the clamping surface of the tube can be high, and difficult to achieve in the context of final assembly.

Thus, even though the system of EP 2 598 785 gives satisfaction in a large number of applications, it is desirable to propose another solution that enables the clamping system to be pre-mounted on the end of the first tube, while being substantially free of the above-mentioned drawbacks, in particular for collars of large diameters.

EP 1 451 498 proposes a system enabling pre-mounting to be performed relative to a tube by using pre-mounting tabs that are likewise carried by the belt via a washer that is itself carried by the belt. The same problems as those mentioned above can arise for pre-mounting relative to a single tube.

Other types of clamping system are also known that comprise a collar and a washer carried by the collar, the washer presenting inner tabs suitable for gripping the inside of one of the tubes in order to pre-mount the clamping system on the end of that tube. It can be useful to extend that system so as to make it possible also to provide pre-mounting relative to the other tube. For that purpose, it is possible to use the long tabs proposed in EP 2 598 785, however, in particular for collars of large diameter, there exists a need for another solution that is substantially free from the above-mentioned drawbacks.

SUMMARY OF THE DISCLOSURE

In general manner, there exists a need for a clamping system enabling retention to be controlled in the pre-mounted state relative to the clamping surface of one of the tubes that is to be clamped.

This object is achieved by a clamping system for connecting together a first tube and a second tube having facing ends presenting clamping surfaces projecting relative to the cylindrical outside surfaces of said tubes, the system comprising a collar that comprises a belt suitable for being clamped around said clamping surfaces, the belt presenting first and second flanks between which there is defined an inner setback suitable for receiving the clamping surfaces, the collar carrying an angularly distributed series of foldable fingers, each finger of the series presenting a free operating end projecting axially beyond a first edge of the belt over a distance that is sufficient to enable it to be manipulated by hand, the fingers being suitable, starting from an initial position in which they define a rest minimum diameter, for being folded manually and plastically towards the axis of the belt in order to define a folded-in minimum diameter that is less than said rest minimum diameter.

In the meaning of the present disclosure, the concept of a "minimum diameter" refers to the smallest diametral dimensions of the annular passage defined by the fingers. For example, if the fingers present particular shapes, in particular undulations, the minimum diameter is the diameter of the circle defined by the zones of the various fingers that are the closest to the axis of the belt.

The clamping system as defined in this way in the present disclosure, can be arranged initially around the end of the first tube by engaging the camping surface of the first tube in the system, while the fingers are in their initial position, given that their rest minimum diameter is then not less than the maximum diameter of the clamping surface of the first tube.

Once the end of the first tube has been engaged in this way in the clamping system, the operator can deform the fingers manually in order to fold them towards the axis of the belt, in particular by moving them closer to the cylindrical surface of the first tube, so that the folded-in minimum diameter that they define at the end of this plastic deformation is less than the maximum diameter of the clamping surface of the first tube. The fingers as folded in in this way then retain the first tube inside the clamping system against disengagement in a direction opposite to the engagement direction. The fingers may be folded to come as close as possible to the outer surface of the first tube and hold its end accurately in position in the clamping system, thereby avoiding the system being pre-mounted on a slant or in unsuitable manner at the end of the first tube.

Optionally, each finger presents one or more first undulation with its convex side facing towards the axis of the belt and with the respective positions of its vertex defining said minimum diameters.

Optionally, each finger also presents one or more second undulation that is situated between the first undulation and the inner end of the finger remote from its free end, and having its concave side facing towards the axis of the belt.

Optionally, one or more of the fingers of the series presents a longitudinal spline; and optionally all of the fingers of the series present respective longitudinal splines.

Optionally, the length by which the fingers project beyond the first edge of the belt is 5 millimeters (mm) or more.

Optionally, the width of the fingers, at least in their zones projecting beyond the first edge of the belt, is 5 millimeters (mm) or more.

The foldable fingers may project directly from the belt of the collar, e.g., by being made integrally therewith, or else they may be fastened thereto by any suitable means, e.g., by welding. Nevertheless, the fingers may be carried by an additional part that is itself carried by the belt. Thus, optionally, the clamping system may include a washer carried by the collar, the fingers projecting from the washer, and optionally being integral with the washer.

Optionally, an annular gap is left between the second flank and the washer, and the fingers extend from the washer towards the first flank and beyond the first flank.

For example, the washer presents fastener tabs co-operating with the collar in order to retain the washer relative to the belt while leaving this annular gap between the second flank and the washer. By way of example, the fastener tabs may co-operate with the belt and, in particular, with its second flank. Under such circumstances, the fingers may extend from one side of the washer, and the fastener tabs may extend from the other side. In another example, when the collar includes a clamping screw, the fastener tabs may comprise a tab shaped as a retaining loop that projects radially from the washer and through which the screw is engaged, optionally together with one or more other tabs connecting the washer to the belt, e.g., by being hooked onto or pinched against a portion of the belt.

Optionally, the washer presents elastically deformable pre-mounting tabs that are suitable, in the non-clamped state of the belt, for retaining the collar relative to the second tube when the bearing surface of said second tube is engaged in the inner setback. These tabs may be configured to cooperate with the outer surface of the second tube, or on the contrary with its inner surface.

The present disclosure also provides an assembly comprising a clamping system as defined above together with a first tube and a second tube having facing ends presenting the clamping surfaces projecting relative to their cylindrical outside surfaces, in which assembly the rest minimum diameter is not less than the maximum diameter of the clamping surface of the first tube, while said folded-in minimum diameter is less than said maximum diameter, such that the folded-in fingers retain the collar relative to the clamping surface of the first tube when said clamping surface is engaged in the inner setback.

The present disclosure also provides a mounting method for mounting an assembly comprising a clamping system as defined above together with a first tube and a second tube having facing ends presenting the clamping surfaces projecting relative to their cylindrical outside surfaces, in which method the free end of the first tube is engaged in the inner setback from the first edge of the belt while the fingers are in their initial position, until the clamping surface of the first tube penetrates into the inner setback, and then the fingers are folded down behind the clamping surface of the first tube in order to retain the clamping system against the first tube disengaging in the direction opposite to the engagement direction.

Optionally, when the system includes a washer that is carried by the collar and that presents pre-mounting tabs as defined above, the free end of the second tube is engaged initially in the inner setback from the second edge of the belt until said free end penetrates into the annular gap left between the second flank and the washer so that the clamping system is retained relative to the second tube by the pre-mounting tabs. Thereafter, as mentioned above, the free end of the first tube is engaged in the inner setback, and then the fingers are folded down so as to pre-mount the first tube likewise.

The free ends of the fingers form kinds of paddles that provide an area that is sufficient to enable the fingers to be manipulated by hand in order to be deformed. Nevertheless, the fingers may present intermediate zones in which their stiffness is increased locally (i.e., their modulus of elasticity is locally higher) so that their plastic deformation while being folded down modifies the shape of the zone in question only a little. By way of example, this may be achieved by providing the fingers with one or more undulations and/or one or more longitudinal splines. In general, modifying certain zones by work-hardening increases the elastic modulus of those zones. Providing those zones are limited in number and in size, a good compromise can be obtained between being able to deform the fingers plastically easily in manual manner, and to ensure that they retain their shapes that result from their plastic deformation while forming retention surfaces that are effective for the clamping surface of the first tube.

The present disclosure can be well understood and its advantages appear better on reading the following detailed description of an embodiment shown by way of non-limiting example.

BRIEF DESCRIPTION OF THE DRAWINGS

The description refers to the accompanying figures, in which.

DETAILED DESCRIPTION OF THE DISCLOSURE

Figure 1A:
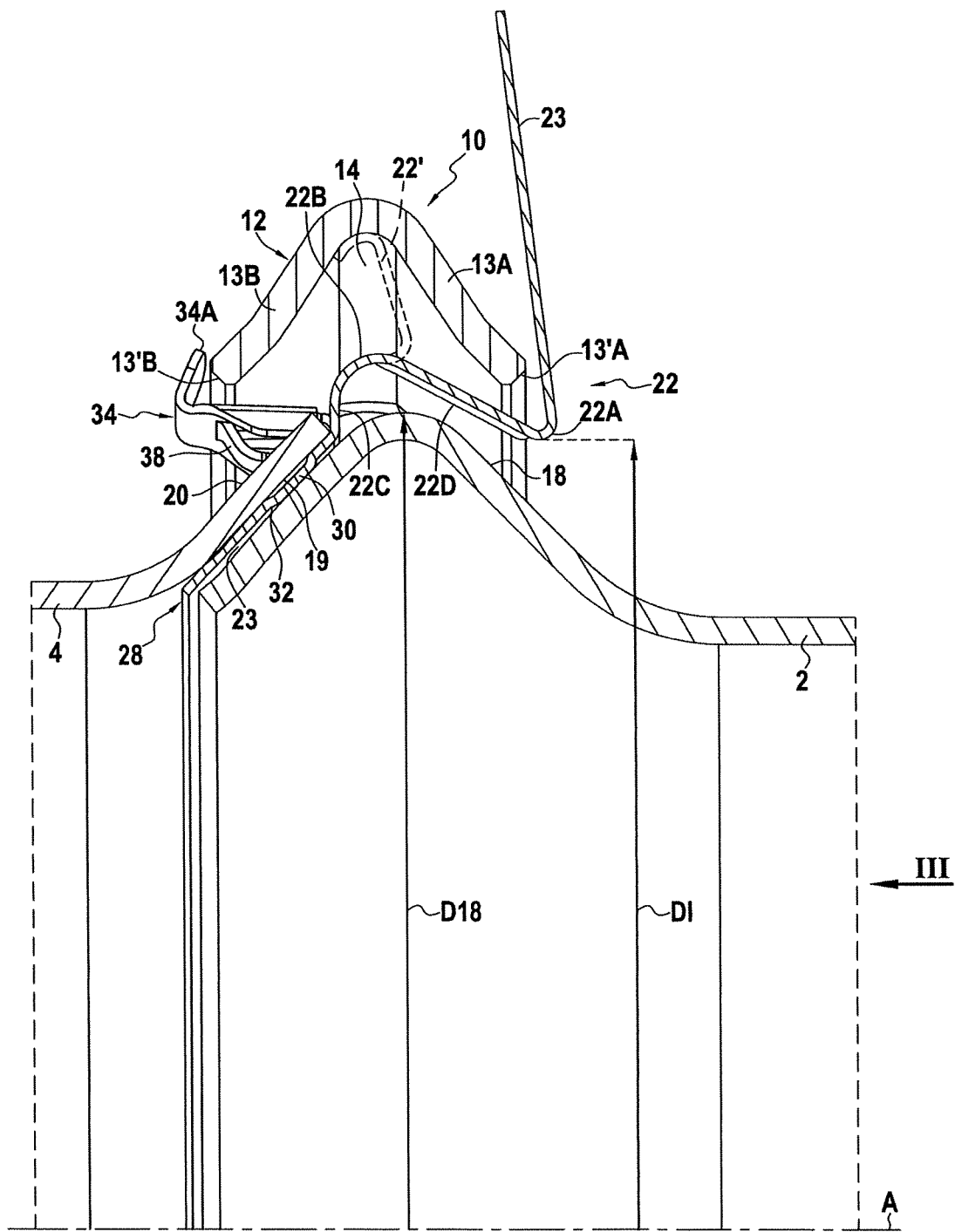
FIGS. 1A and 1B are axial half-section views of the clamping system of the invention, arranged around the ends of first and second tubes.
Figure 1B:
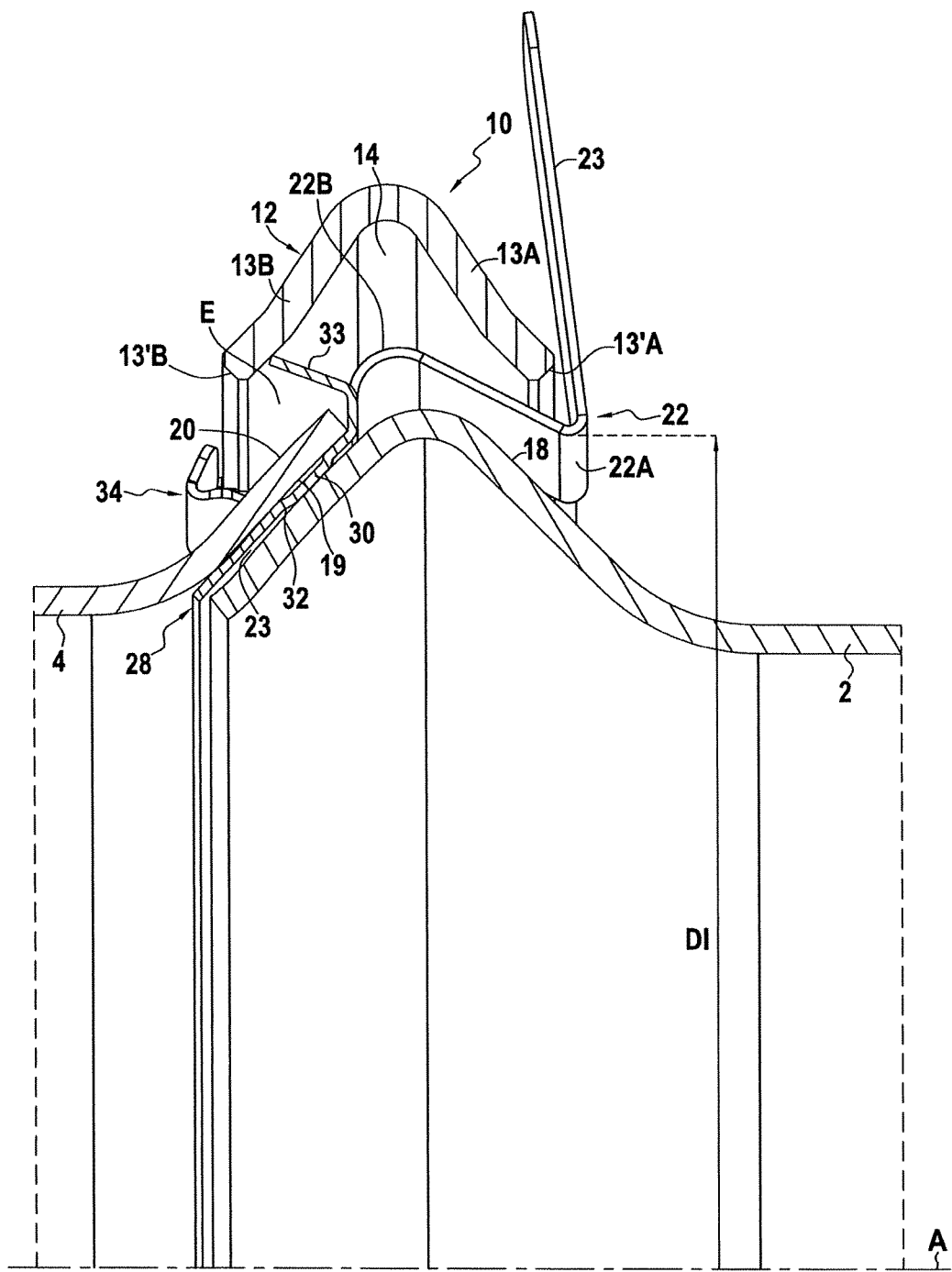
Figure 2:
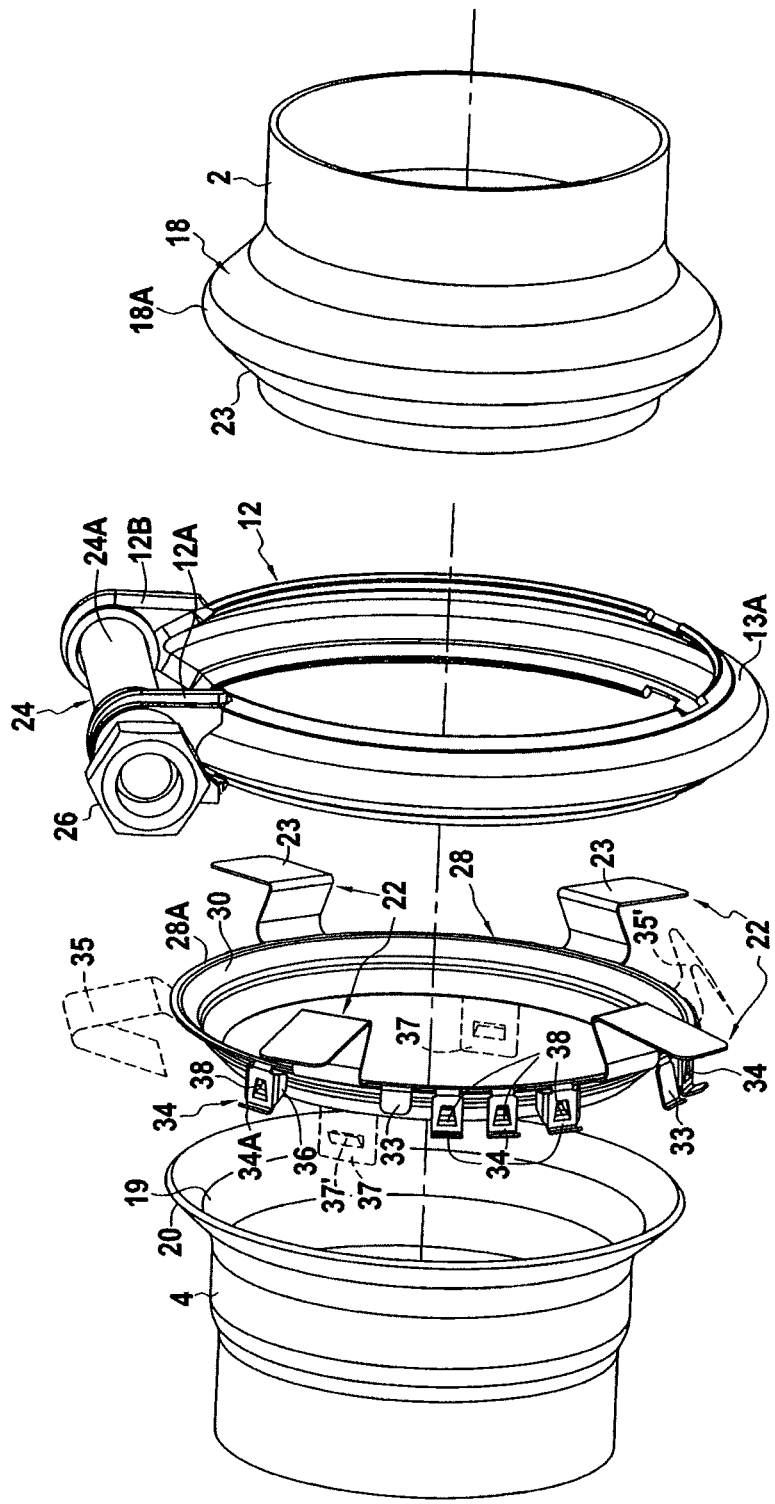
FIG. 2 is an exploded perspective view showing the clamping system comprising a clamping collar and a clamping washer that are separate from each other, and also showing the ends of the first and second tubes.
Figure 3:
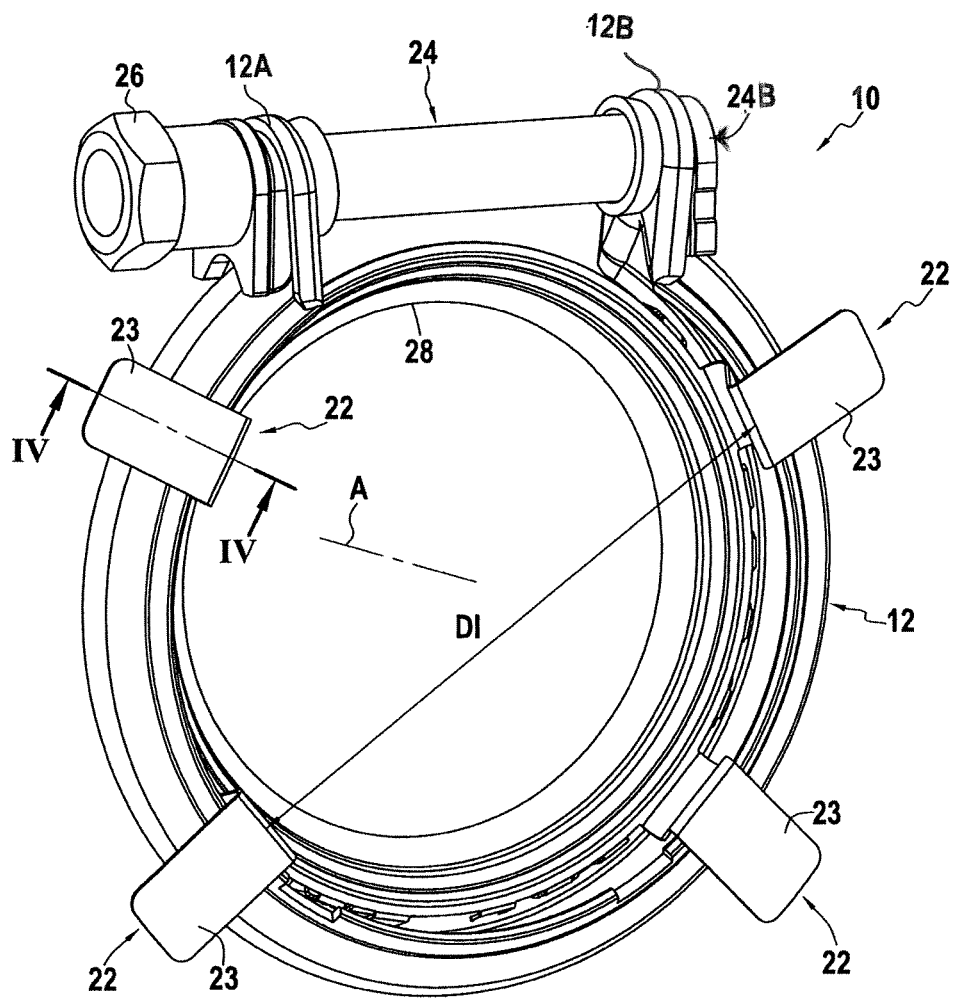
FIG. 3 is a perspective view looking along arrow III in FIG. 1A and showing the clamping system on its own.

The description begins with FIGS. 1A, 1B, and 2. In these figures, it can be seen that the clamping system comprises a collar 10, of the same type as that described in EP 2 598 785, and a washer 28, which co-operate in order to assemble together two tubes 2 and 4.

Throughout the description below, the term "inner" is used for elements that face towards the axis A of the two abutting tubes and that are closer to the axis A than are other elements that are said to be "outer", the "outer" elements also being those that face away from the axis A. It is also considered that the axis A of the two tubes is likewise the axis of the belt of the collar, which is rolled into a loop.

The collar comprises a belt 12 that defines a setback 14 in which the respective bearing surfaces 18 of the first tube 2 and 20 of the second tube 4 can be inserted. This setback and these bearing surfaces are of shapes such that clamping the belt of the collar constrains the ends of the tubes 2 and 4 to move towards each other. The setback 14 is defined between first and second flanks 13A and 13B of the belt 12, these flanks specifically defining the branches of a V-shape when seen in axial section. Thus, the belt 12 may present an axial section that is V-shaped, while the bearing surfaces 18 and 20 present a diameter that increases progressively towards the facing free ends of the tubes and may, for example, be frustoconical in shape.

The belt 12 presents respective ends 12A and 12B that are folded substantially radially outwards so as to form bearing tabs. These tabs are pierced so as to pass the shank 24A of a clamping screw 24 through the tabs. The head 24B of the screw is held relative to one of the bearing tabs, specifically the tab 12B, while a nut 26 is retained relative to the other bearing tab 12A. It can be understood that turning the nut in the screw-tightening direction moves the bearing tabs towards each other and thus reduces the inside diameter of the collar, i.e., it serves to clamp the belt. Naturally, it is possible to envisage other ways of clamping the belt, e.g., systems involving hooking, as described in particular in patent application FR 3 008 160.

The collar also carries a series of foldable fingers 22 that are angularly distributed, as can be seen better in FIG. 2. FIGS. 1A, 1B, and 2 show these fingers in their initial position in which they define a rest minimum diameter DI. It can be seen that this diameter DI is greater than the maximum diameter D18 (half of which is shown in FIG. 1A) of the bearing surface 18 of the first tube 2. In other words, the rest minimum diameter DI defined by the foldable fingers 22 is greater than the maximum diameter D18 of the bearing surface of the first tube 2. By convention, the minimum diameter defined by the foldable fingers is the smallest diametral dimension that the fingers define in their zones other than where they are attached to the collar 28, as described below. This is the smallest through diametral dimension that these fingers define for an element having a cylindrical surface (the first tube) that is being engaged between the fingers.

The foldable fingers 22 could project directly from the belt 12, e.g., by being fastened thereto by connection segments 22' shown in dashed lines in FIG. 1A, and by way of example they could be welded to the vertex of the setback 14, or to some other portion of the belt, which could be an inner portion or an outer portion.

Nevertheless, in the example shown, the fingers are projected from the washer 28. Specifically, the clamping system comprises a washer 28 that is secured to the collar and that presents the foldable fingers 22. As can be seen in FIGS. 1A and 1B, the washer 28 presents a frustoconical portion 30 that can be inserted between the facing ends of the two tubes 2 and 4 when they are engaged in the clamping system. Specifically, the washer 28 is held relative to the belt, in particular relative to its second flank 13B, by fastener tabs (described below) in such a manner that an annular gap E (see FIG. 1B) is arranged between the second flank and the washer. The free end of the second tube 4 carrying its bearing surface 20 becomes inserted in this annular gap E inside the setback 14, while the free end of the first end tube 2 carrying its bearing surface 18 becomes inserted in the side of the annular gap E that is opposite relative to the washer, i.e., against the inner face of the frustoconical portion 30 of the washer 28.

Specifically, the end of the tube 4 has a flared female shape with its inner periphery forming a flare 19. In contrast, the free end of the first tube 2 is a male end that, beyond the bearing surface 18, presents an outside periphery 23 of diameter that decreases towards the termination of the free end. The end portion formed in this way can thus be inserted as a substantially complementary shape inside the flare 19 formed at the end of the tube 4. The frustoconical portion 30 of the washer 28 in this example presents annular deformations 32 forming a sealing gasket between the inner surface of the flare 19 and the outer periphery 23.

The fastening of the washer 28 of the collar 10 and/or the pre-mounting of the clamping system comprising the collar and the washer on the tube 4 may be performed in the same manner as in EP 2 598 785 and EP 1 451 498, by means of fastener tabs and/or pre-mounting tabs that are provided by the washer. Thus, in the example shown, the washer 28 presents a series of inner tabs 33 that can be seen more clearly in FIG. 1B. When the washer is assembled with the collar, these tabs co-operate with the inner periphery of the flank 13B of the belt and they hold the portion 30 of the washer at a distance from that flank so as to leave the above-mentioned gap E. The fastener tabs also comprise outer tabs 34 that can be seen in particular in FIGS. 1A and 1B that are longer so as to project beyond the free inner edge 13'B of the flank 13B. Specifically, the free ends of these outer tabs 34 are curved so as to form hooks 34A that approach the outer face of the flank 13B.

Specifically, these outer tabs 34 also serve to pre-mount the clamping system on the tube 4. It can be seen that tongues 38 are cut out in these outer tabs so as to have their free ends directed from beside the attachment zones of the outer tabs towards the washer, extending radially inwards so as to be capable of approaching the bearing surface 20 of the tube 4. Naturally, provision may also be made for such tongues 38 or the like to be made in tabs other than the outer tabs of curved hook-shape.

In FIG. 2, it can also be seen that the outer tabs present inwardly-folded fins 36 on their longitudinal edges. The fastener tabs 33 and 34 are of small dimensions and they deform elastically in order to hook the washer inside the belt and hook the clamping system comprising the collar and the washer onto the clamping surface 20 of the tube 4. The clamping system can thus be pre-mounted on the end of the tube 4. The tabs 33 and 34 deform during clamping so as to press against the inner periphery of the flank 13A of the belt 12 of the collar, thereby not opposing clamping.

It is possible to use other means for fastening the washer to the collar. For example, and as shown by dashed lines in FIG. 2, the washer could present a retaining loop 35 in which the shank of the screw 24 can be engaged, together with one or more retaining tabs 35' that may be retained on the edge of the belt, e.g., by hooking or by pinching. Likewise, it is possible to use other ways of pre-mounting the clamping system relative to the tube 4, e.g., as shown in dashed lines in FIG. 2, by providing the washer with inner tabs 37 that engage in the tube 4 and that have outwardly projecting barb tongues 37' capable of gripping the inner surface of the tube 4.

In order to mount the assembly comprising the two tubes and the clamping system, the free end of the tube 4 is engaged initially in the annular gap E so as to pre-mount the clamping system around this annular end, and then the free end of the tube 2 is engaged in the clamping system, until reaching the position shown in FIGS. 1A and 1B.

Figure 4:
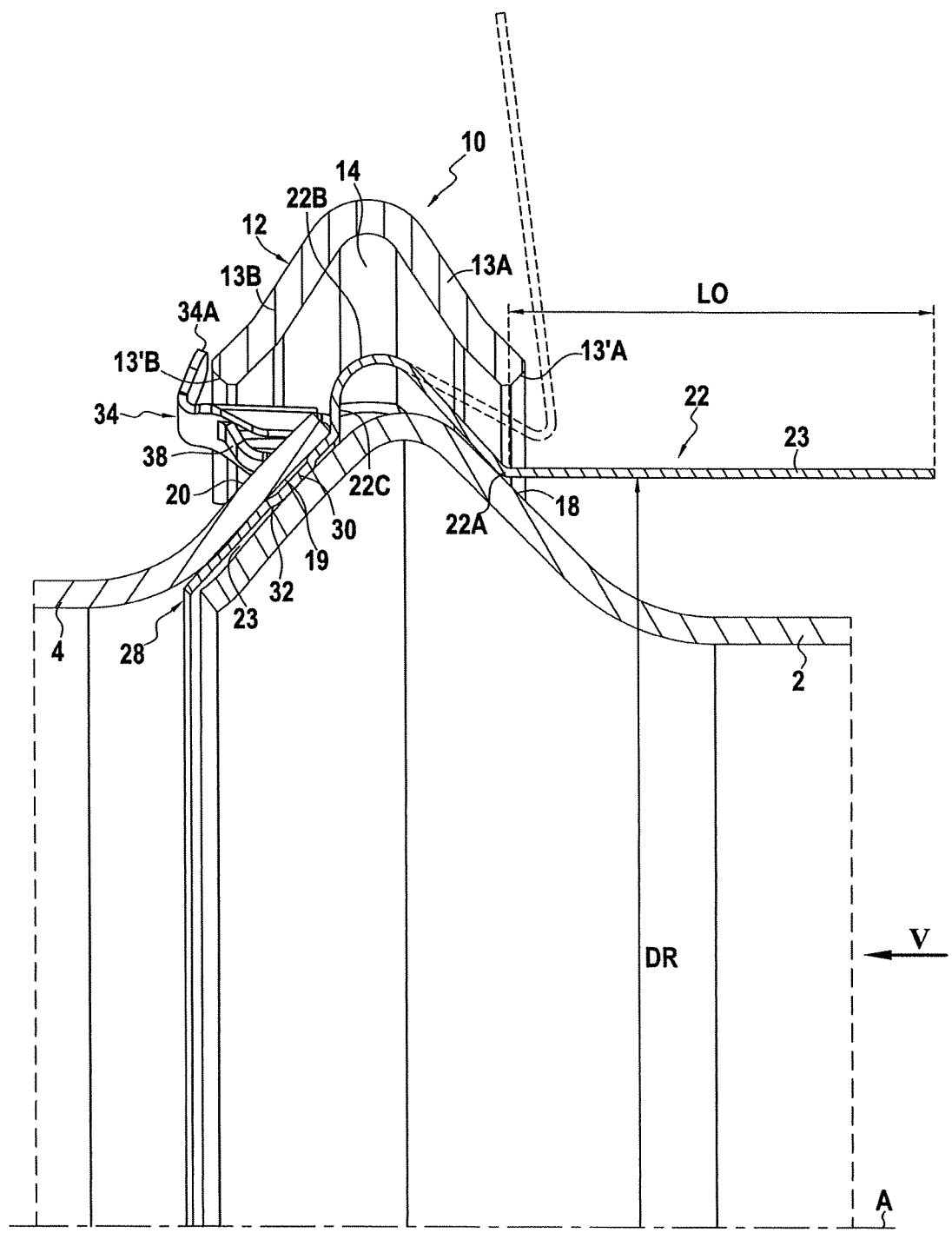
FIG. 4 is a view analogous to FIG. 1A showing the clamping system in the pre-mounted position on the tubes.
Figure 5:
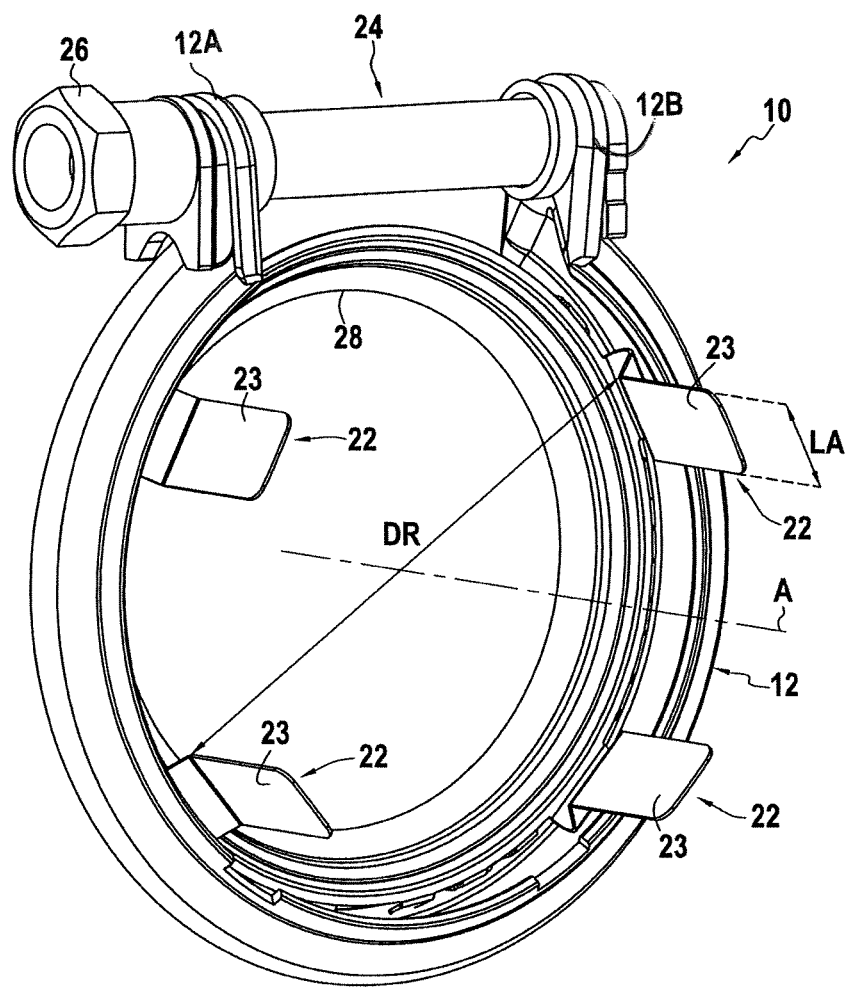
FIG. 5 is a perspective view looking along arrow V in FIG. 4 and showing the clamping system on its own.

The foldable fingers 22 are then in their initial position, so this engagement can be performed without particular effort. Nevertheless, in this situation, the clamping system is not held pre-mounted on the end of the tube 2 which can be disengaged merely by pulling. In order to achieve such pre-mounting, the foldable fingers 22 need to be folded towards the axis, as shown in FIGS. 4 and 5. In this situation, these fingers define between them a folded-in minimum diameter DR that is less than the rest minimum diameter, and less than the maximum diameter D18 defined by the clamping surface 18 of the tube 2. Consequently, in this situation, the free end of the tube 2 is also retained inside the clamping system. The clamping system is then pre-mounted on both tubes.

The fingers 22 present free operating ends 23 that project a long away beyond the edge 13'A of the belt on the side where the tube 2 is engaged (which is specifically the free edge of the flank 13A). In particular, the projecting length LO of the fingers beyond this edge is generally at least 2 mm and potentially at least 8 mm. This length generally lies in the range 5 mm to 20 mm, and more preferably in the range 8 mm to 15 mm. The projecting length is thus sufficient to enable the fingers to be operated manually from their free ends. Furthermore, the width LA of the fingers, at least in their zones that project beyond the first edge 13'A, may be at least 5 mm, e.g., lying in the range 5 mm to 10 mm. These projecting free ends thus act somewhat like paddles providing contact areas that are sufficient to enable an operator's fingers to actuate them.

In the FIGS., it can also be seen that each finger 22 presents a first undulation 22A having its convex side facing towards the axis A of the belt. The above-mentioned rest minimum diameter DI and the folded-in diameter DR are measured as being the diameter dimensions of a circle defined by the vertices of the undulations 22A of the various fingers 22 in the region of the edge 13'A. It can also be seen that each finger 22 also presents a second undulation 22B that is situated between the first undulation 22A and the inner end 22C of the finger remote from its free end 23. This inner end 22C constitutes the base of the finger attaching it to the frustoconical portion 30 of the washer 28. The undulations 22A and 22B are in opposite directions, with the concave side of the undulation 22B facing towards the axis A.

These undulations can be seen in an axial section of the fingers 22. Thus, when seen in axial section and at rest, a finger 22 is substantially in the shape of the letter N, with rounded corners, and its termination may be elongate like a tail so as to form the free operating end 23.

In the region of these undulations, the finger is work-hardened so that the curvature of these undulations is modified little during plastic deformation of the finger. This deformation takes place essentially by tilting in the region of the base 22C of the finger. It can also be seen that the finger may present at least one longitudinal spline along all or part of its length. Specifically, the fingers shown present a longitudinal spline 22D situated in the connection zone between the above-mentioned undulations 22A and 22B.

It is appropriate at this point to indicate that the plastic deformations of the fingers can be reversed by the operator, who can raise the fingers if the tube 2 was pre-mounted in error, thereby enabling the operator to extract the tube from the clamping system without great effort.

Figure 6:
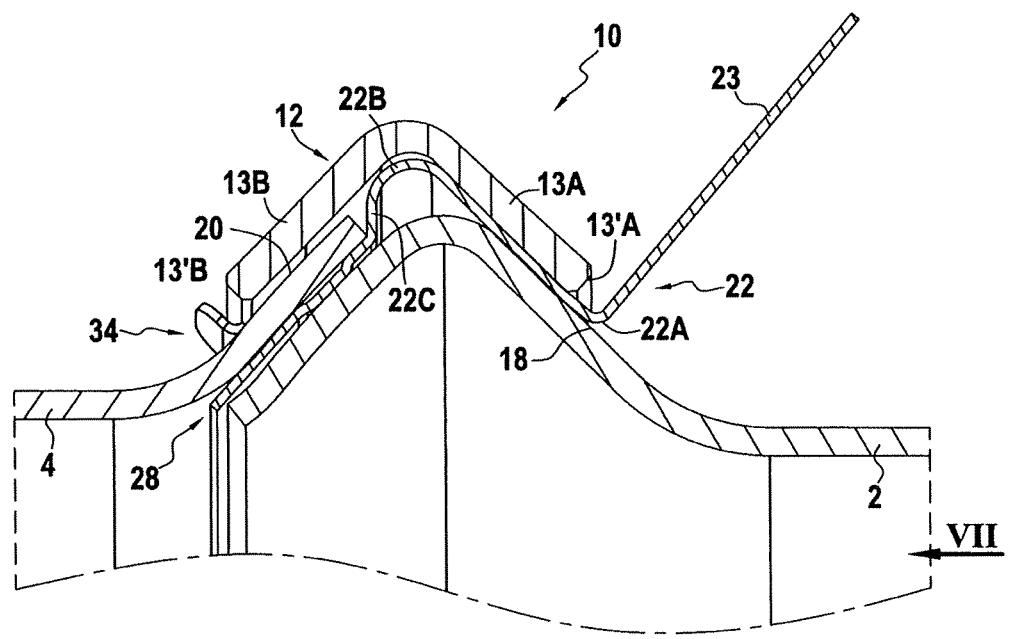
FIG. 6 is a view analogous to FIG. 1A and FIG. 4 showing a portion of the clamping system when clamped onto the ends of two tubes.
Figure 7:
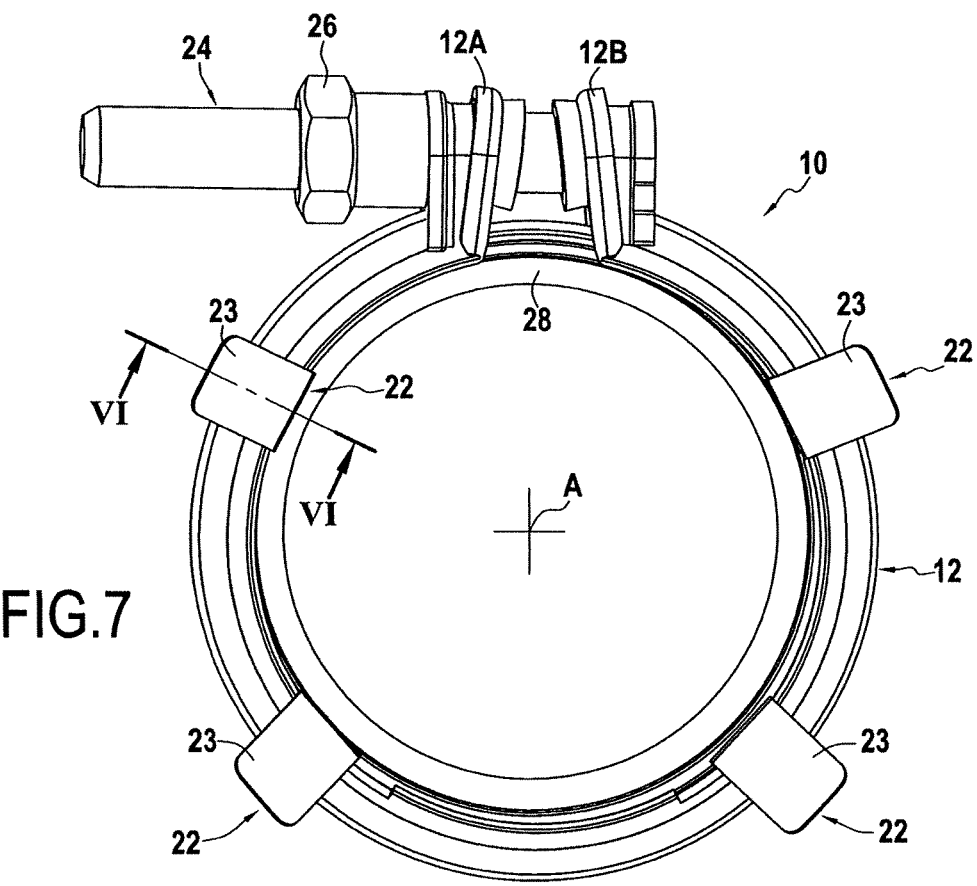
FIG. 7 is an end view looking along arrow VII of FIG. 6 and showing the clamping system on its own.

Outside the above-mentioned potentially work-hardened zones, the fingers 22 present a degree of flexibility and a modulus of elasticity that is smaller than the above-described tabs 33 and 34. Consequently, they deform easily during clamping of the collar, even though their free operating ends 23 then stand up a little, as shown in FIGS. 6 and 7, but without that harming the clamping force.

The fingers 22 are distributed angularly, optionally in substantially regular manner, and, by way of example, there may be two, three, or four fingers.

The clamping belt and the washer are optionally made of metal. In particular as regards the washer, it may be made of austenitic type stainless steel sheet, and in particular its thickness may lie in the range 0.1 mm to 0.5 mm, and in particular in the range 0.2 mm to 0.4 mm.

The invention claimed is:

1. A clamping system for connecting together a first tube and a second tube having facing ends presenting clamping surfaces projecting relative to the cylindrical outside surfaces of said tubes, the system comprising a collar that comprises a belt suitable for being clamped around said clamping surfaces and a washer carried by the collar, the belt presenting first and second flanks between which there is defined an inner setback suitable for receiving the clamping surfaces, an angularly distributed series of foldable fingers projecting from the washer, each finger of the series presenting a free operating end projecting axially beyond a first edge of the belt over a distance that is sufficient to enable said each finger to be manipulated by hand, the fingers being suitable, starting from an initial position in which said fingers define a rest minimum diameter, for being folded manually and plastically towards an axis of the belt in order to define a folded-in minimum diameter that is less than said rest minimum diameter.

2. A clamping system according to claim 1, wherein each finger presents one or more first undulation with a convex side facing towards the axis of the belt and with respective positions of vertex of said undulation defining said minimum diameters.

3. A clamping system according to claim 2, wherein each finger also presents one or more second undulation that is situated between the first undulation and the inner end of the finger remote from the free end of the finger, and having a concave side facing towards the axis of the belt.

4. A clamping system according to claim 1, wherein one or more of the fingers of the series presents a longitudinal spline.

5. A clamping system according to claim 1, wherein the length by which the fingers project beyond the first edge of the belt is 5 mm or more.

6. A clamping system according to claim 1, wherein the width of the fingers, at least in zones projecting beyond the first edge of the belt, is 5 mm or more.

7. A clamping system according to claim 1, wherein the washer presents fastener tabs that co-operate with the collar.

8. A clamping system according to claim 7, wherein the fingers are integral with the washer.

9. A clamping system according to claim 1, wherein an annular gap is left between the second flank and the washer, and the fingers extend from the washer towards the first flank and beyond the first flank.

10. A clamping system according to claim 9, wherein the washer presents elastically deformable pre-mounting tabs that are suitable, in the non-clamped state of the belt, for retaining the collar relative to the second tube when the bearing surface of said second tube is engaged in the inner setback.

11. An assembly comprising a clamping system according to claim 1, together with a first tube and a second tube having facing ends presenting clamping surfaces projecting relative to cylindrical outside surfaces of said first tube and second tube, in which assembly the rest minimum diameter is not less than the maximum diameter of the clamping surface of the first tube, while said folded-in minimum diameter is less than said maximum diameter, such that the folded-in fingers retain the collar relative to the clamping surface of the first tube when said clamping surface is engaged in the inner setback.

12. A mounting method for mounting an assembly comprising a clamping system according to claim 1 together with a first tube and a second tube having facing ends presenting the clamping surfaces projecting relative to cylindrical outside surfaces, in which method the free end of the first tube is engaged in the inner setback from the first edge of the belt while the fingers are in their initial position, until the clamping surface of the first tube penetrates into the inner setback, and then the fingers are turned down behind the clamping surface of the first tube in order to retain the clamping system against the first tube disengaging in the direction opposite to the engagement direction.

13. A mounting method according to claim 12, wherein the clamping system is according to claim 10, and wherein the free end of the second tube is engaged initially in the inner setback from the second edge of the belt until said free end penetrates into the annular gap left between the second flank and the belt.

\* \* \* \* \*